W. D. BALL & J. G. BRADBURN.
COTTON PICKER.
APPLICATION FILED JUNE 29, 1911.
1,035,300.
Patented Aug. 13, 1912.
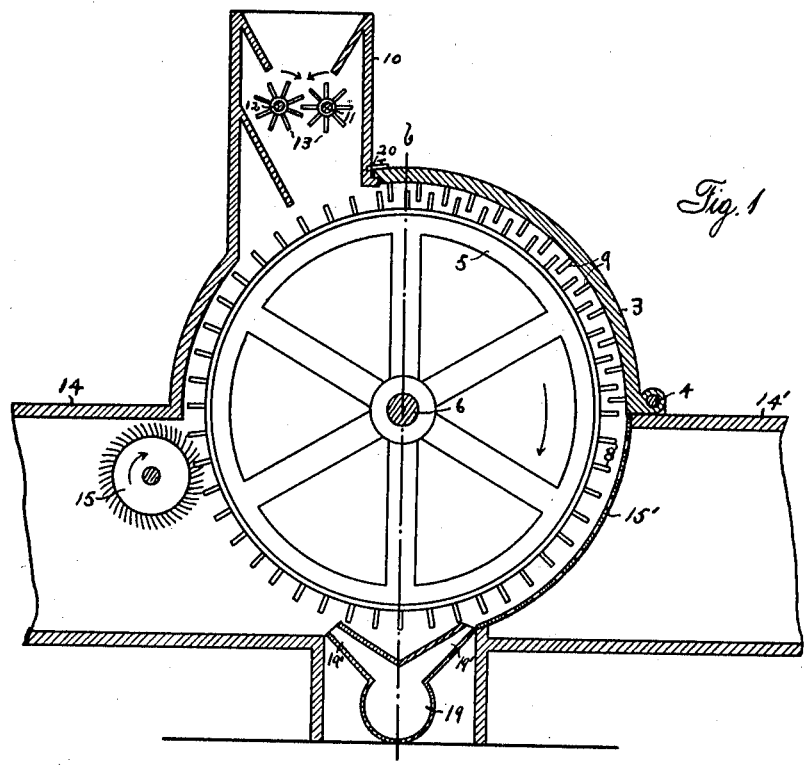
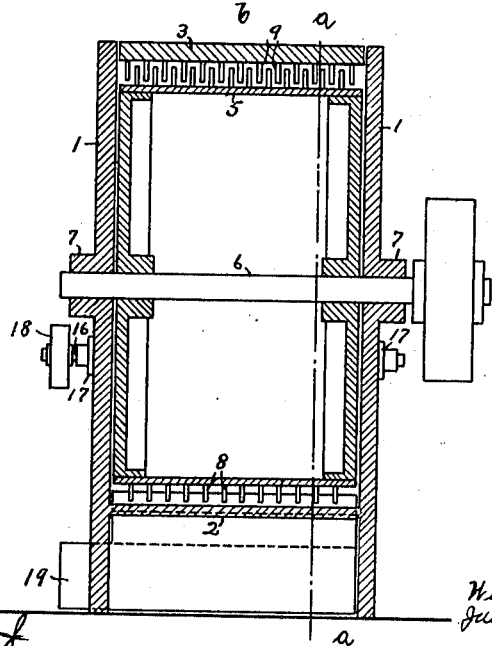
WITNESSES:
Geo E Smith
C M Jones
INVENTORS
William D. Ball,
Justin G. Bradburn,
BY
Hardway & Cathey.
ATTORNEYS.

UNITED STATES PATENT OFFICE.

WILLIAM D. BALL AND JUSTIN G. BRADBURN, OF HOUSTON, TEXAS.

COTTON-PICKER.

1,035,300.

Specification of Letters Patent.

Patented Aug. 13, 1912.

Application filed June 29, 1911. Serial No. 635,974.

*To all whom it may concern:*

Be it known that we, WILLIAM D. BALL and JUSTIN G. BRADBURN, citizens of the United States, residing at Houston, in the county of Harris and State of Texas, have invented certain new and useful Improvements in Cotton-Pickers, of which the following is a specification.

Our invention relates to new and useful improvements in cotton pickers.

The object of the invention is to provide a machine of the character described for the purpose of cleaning cotton samples and other detached portions of refuse and dirty cotton and separating the refuse therefrom and reducing the same to the condition they were in when they originally left the cotton gin.

With the above and other objects in view the invention has particular relation to certain novel features of construction, operation and arrangement of parts an example of which is given in this specification and illustrated in the accompanying drawings, wherein:—

Figure 1 is a sectional end elevation of the machine taken on the line *a—a* of Fig. 2, and Fig. 2 is a sectional side view taken on the line *b—b* of Fig. 1.

Referring now more particularly to the drawings, the numerals 1, 1 designate the end members of the casing, said casing being substantially cylindrical and having a bottom 2 which is stationary, and a top 3 which is hinged at the point 4 so that it may be opened and closed in the manner of a door.

Mounted within the casing is the drum 5 which is rigidly fixed on shaft 6 rotatably mounted in bearings 7, 7 carried by the end members 1, 1. The periphery of this drum is a solid casing which is supported by suitable spokes which radiate from the supporting shaft to said casing. The periphery of the drum is provided with rows of outwardly extending spikes or teeth 8, said rows continuing entirely around the circumference thereof, and the inner surface of the top 3 is provided with similar rows of inwardly extending teeth 9, which are staggered with relation to the rows of the drum so that as the drum rotates the teeth thereof will pass the teeth carried by said top without clashing. The shaft 6 carries a rigidly mounted band wheel through which the shaft 6 and the drum carried thereby receive rotation from a suitable motor (not shown).

A suitable inlet chute 10 is provided through which the cotton to be combed passes from the feeder (not shown) in to the casing from above and falls on top of drum 5. Transversely mounted in this chute are two rotatable shafts 11 and 12 which are provided with radiating teeth 13, so that as the shafts rotate in the direction indicated by the arrows in Fig. 1 the cotton is caught by teeth 13 from above and forced downwardly and on to the drum 5. The cotton is caught by teeth 8 of the drum and carried around by them and forced to pass between teeth 8 and 9 and is by them thoroughly combed out and reduced to its original state.

Extending from the casing on each side are discharge chutes 14 and 14' the former of which leads to a condenser (not shown), and conveys the clean cotton to said condenser and the latter of which is provided to convey the refuse from the casing. The chute 14' is provided with a screen 15', across its inner end which partially surrounds the drum. This screen is provided to permit the passage of the refuse to the chute 14' but prevents the passage of the cotton through said chute.

Transversely mounted in chute 14 is a cylindrical brush 15, rigidly mounted on the shaft 16 which is rotatable in suitable bearings 17, 17, carried by the end members 1, 1 and which receives rotation through band wheel 18 rigidly mounted thereon, from a suitable motive means (not shown). This brush contacts with the teeth of drum 5 and rotates in a direction the opposite of the rotation of the drum and is provided to brush all cotton from the teeth 8 and leave the same free to be carried along chute 14 to the condenser, by the air current passing along said chute.

Beneath the bottom 2, of the casing, is an oblong nozzle 19 which extends the full length of the cylinder and discharges through two discharges 19' into chutes 14 and 14' and at a tangent to the surface of the drum 5 on both sides. This nozzle is connected to a suitable air current generator (not shown) and the air current passing therefrom passes through the nozzle and against the drum on one side just in front of brush 15 and directs said current through said chute 14 and carries the cotton toward the said condenser and on the other side the air current passes through the cotton and carries the refuse through the screen 15′ and along chute 14′. In case too much cotton should be carried by the drum teeth between the drum and top 3, the latch 20, which engages the free edge of the top with chute 10, may be disengaged and the said top drawn back and the surplus cotton removed.

What I claim is:—

1. A device of the character described including a suitable casing having a movable section hinged thereto, a rotatable cylinder mounted therein, outwardly projecting teeth on the periphery of the cylinder and inwardly extending teeth carried by the movable section, said teeth being arranged in staggered relation with respect to each other, a suitable inlet chute leading into the casing and an outlet chute leading therefrom on each side, a rotatable brush mounted in one outlet chute and rotating against the cylinder and in the opposite direction and a current directing nozzle having a double discharge and discharging into said outlet chutes and against said cylinder.

2. A device of the character described including a suitable casing having a movable section hinged thereto, a rotatable cylinder mounted therein, outwardly projecting teeth on the periphery of the cylinder and inwardly extending teeth carried by the movable casing section, said teeth being arranged in staggered relation with respect to each other, a suitable inlet chute leading into the casing and two outlet chutes leading therefrom one on each side a rotatable brush mounted in the outlet chute and rotating against the cylinder and in the opposite direction, and an oblong nozzle extending the full length of the cylinder and having two discharges which discharge respectively into the two outlet chutes and against said cylinder.

In testimony whereof we have signed our names to this specification in the presence of two subscribing witnesses.

WILLIAM D. BALL.
JUSTIN G. BRADBURN.

Witnesses:
　E. SCHULLER,
　M. S. CLARKE.

Copies of this patent may be obtained for five cents each, by addressing the "Commissioner of Patents, Washington, D. C."